United States Patent
Chen et al.

(10) Patent No.: US 12,449,560 B2
(45) Date of Patent: Oct. 21, 2025

(54) CHECKING METHOD AND CHECKING SYSTEM BASED ON MILLIMETER WAVE SECURITY INSPECTION DEVICE AND SERVER

(71) Applicants: NUCTECH COMPANY LIMITED, Beijing (CN); Tsinghua University, Beijing (CN)

(72) Inventors: Zhiqiang Chen, Beijing (CN); Ziran Zhao, Beijing (CN); Yingkang Jin, Beijing (CN); Xiaoyi He, Beijing (CN); Li Zhang, Beijing (CN); Mengjiao Zhao, Beijing (CN); Zhimin Zheng, Beijing (CN); Yihai Zhang, Beijing (CN); Yaning Li, Beijing (CN); Xiaoxiao Feng, Beijing (CN)

(73) Assignees: NUCTECH COMPANY LIMITED, Beijing (CN); Tsinghua University, Beijing (CN)

( * ) Notice: Subject to any disclaimer, the term of this patent is extended or adjusted under 35 U.S.C. 154(b) by 273 days.

(21) Appl. No.: 18/013,094

(22) PCT Filed: Jun. 24, 2021

(86) PCT No.: PCT/CN2021/102077
§ 371 (c)(1),
(2) Date: Dec. 27, 2022

(87) PCT Pub. No.: WO2022/001821
PCT Pub. Date: Jan. 6, 2022

(65) Prior Publication Data
US 2023/0251399 A1    Aug. 10, 2023

(30) Foreign Application Priority Data
Jun. 28, 2020 (CN) .......................... 202010600568.2

(51) Int. Cl.
*G01V 8/00* (2006.01)

(52) U.S. Cl.
CPC .................................. *G01V 8/005* (2013.01)

(58) Field of Classification Search
CPC ............................... C01V 8/005; G01V 8/005
(Continued)

(56) References Cited

U.S. PATENT DOCUMENTS

| 2007/0195994 A1 | 8/2007 | McClelland et al. |
| 2010/0034451 A1 | 2/2010 | Hughes |

(Continued)

FOREIGN PATENT DOCUMENTS

| CN | 203535244 U | 4/2014 |
| CN | 203894809 U | 10/2014 |

(Continued)

OTHER PUBLICATIONS

International Search Report with Written Opinion for PCT application No. PCT/CN2021/102077 (14 pages).

(Continued)

*Primary Examiner* — William Kelleher
*Assistant Examiner* — Samarina Makhdoom
(74) *Attorney, Agent, or Firm* — Merchant & Gould P.C.

(57) ABSTRACT

Provided is a server of a checking system based on a millimeter wave security inspection device, connected to a security inspection instrument through a switching system, the server includes a memory and a processor, the memory stores instructions, and the instructions, when executed by the processor, cause the processor to: receive a scanned image of an object and an ATR image interpretation result of the object from the security inspection instrument, wherein the ATR image interpretation result is obtained by the security inspection instrument performing an automatic threat recognition (ATR) image interpretation on the (Continued)

scanned image, and perform a manual inspection task on the object and perform an image interpretation task on the scanned image according to a working mode, wherein the working mode indicates whether the checking system is provided with a manual inspection station and an image interpretation station.

17 Claims, 7 Drawing Sheets

(58) Field of Classification Search
USPC .......................................................... 342/27
See application file for complete search history.

(56) References Cited

U.S. PATENT DOCUMENTS

| | | | |
|---|---|---|---|
| 2015/0186732 A1 | 7/2015 | Perron | |
| 2016/0252646 A1* | 9/2016 | Sarraiocco | G06F 18/22 382/103 |
| 2017/0357857 A1* | 12/2017 | Perron | G01V 5/22 |
| 2018/0172871 A1* | 6/2018 | Kuznetsov | G01V 3/12 |
| 2018/0330170 A1 | 11/2018 | Oya | |
| 2019/0277999 A1* | 9/2019 | Chen | G01S 13/887 |
| 2020/0158860 A1* | 5/2020 | Morton | G01V 3/12 |

FOREIGN PATENT DOCUMENTS

| | | |
|---|---|---|
| CN | 104502368 A | 4/2015 |
| CN | 206292821 U | 6/2017 |
| CN | 107346539 A | 11/2017 |
| CN | 108229449 A | 6/2018 |
| CN | 207946825 U | 10/2018 |
| CN | 109030524 A | 12/2018 |
| CN | 109446875 A | 3/2019 |
| CN | 208588688 U | 3/2019 |
| CN | 110031909 A | 7/2019 |
| JP | 2010530977 A | 9/2010 |
| WO | 2014060227 A1 | 4/2014 |
| WO | 2018023190 A1 | 2/2018 |

OTHER PUBLICATIONS

First Office Action issued on May 27, 2022 from CNIPA for Chinese Patent Application No. 202010600568.2 (15 pages).
Second Office Action issued on Sep. 9, 2022 from CNIPA for Chinese Patent Application No. 202010600568.2 (13 pages).
Cao Tie, et al. "Discussion on baggage security inspection mode in large airports" (3 pages).
First Office Action issued on Nov. 28, 2023 for JP Application No. 2022-580904 (6 pages including English Translation).
Extended European Search Report dated Jun. 12, 2024 for European Patent Application No. EP21833757.4 (15 pages).
Second Office Action dated May 21, 2024 for Japanese Patent Application No. 2022-580904 (4 pages including English translation).

* cited by examiner

CHECKING METHOD AND CHECKING SYSTEM BASED ON MILLIMETER WAVE SECURITY INSPECTION DEVICE AND SERVER

CROSS REFERENCE TO RELATED APPLICATION(S)

This application is a Section 371 National Stage Application of International Application No. PCT/CN2021/102077, filed on Jun. 24, 2021, entitled "CHECKING METHOD AND CHECKING SYSTEM BASED ON MILLIMETER WAVE SECURITY INSPECTION DEVICE AND SERVER", which claims priority to Chinese patent Application No. 202010600568.2, filed on Jun. 28, 2020, the content of which are incorporated herein by reference in their entirety.

TECHNICAL FIELD

The present disclosure relates to a field of security inspection technology, and in particular, to a checking method and a checking system based on a millimeter wave security inspection device.

BACKGROUND

At present, most airport security inspections are still based on the "metal detection door+manual inspection" method. The millimeter wave human body imaging technology is currently an advanced technology in the global security field, and has been used in passenger personal security inspections at airports in the United States, the United Kingdom, the Netherlands, Australia, Japan and other countries. Such device may effectively detect objects hidden in various parts of a human body under a cover of clothing without directly contacting the human body, may especially detect non-metallic objects, and may acquire the shapes, sizes and positions of the hidden objects from images and other information. In addition, a millimeter wave human body imaging device has the characteristics of harmlessness to the human body and strong penetrating power. The transmission power thereof is less than one-thousandth of the electromagnetic wave radiation of a mobile phone. It may accurately identify the objects carried by a human body, effectively improve the objectivity, accuracy, and pertinence, reduce the labor intensity of a security inspector, and improve the security inspection efficiency.

The working method of a millimeter wave security checking system is also usually based on a method similar to "metal door+manual inspection". At present, the method for a security inspection using a millimeter wave security inspection product such as Rohde& Schwarz is divided into four stages: in the first stage (scanning stage), a passenger is scanned by a security inspection instrument, and after performing an automatic threat recognition (ATR), the security inspection instrument shows a cartoon image and a position of a suspect; in the second stage (a manual inspection station selection stage), after the passenger is scanned by the security inspection instrument, a configured manual inspection station number is directly displayed on a screen of the security inspection instrument, a manual inspection station is manually selected and allocated by an operator of the security inspection instrument, and the passenger goes to a position of a selected manual inspection station and waits for a manual inspection; in the third stage (image interpretation stage), when a remote image inspection is required, the security inspection instrument will transmit a scanned image and information recognized by the ATR together to a connected image interpretation station, the scanned image will be manually inspected by an image judger, and then an image interpretation result (pass or alarm) will be submitted to the security inspection instrument; and in the fourth stage (manual inspection stage), the security inspection instrument transmits the cartoon image, suspect position information and the image interpretation result to the manual inspection station selected by the operator before, and a manual inspector performs a manual inspection on the passenger based on the image and the suspect position.

However, the current security checking method has the following problems: all operation data is separately stored in various security inspection instruments, and may not be queried uniformly; after a passenger is scanned by a security inspection instrument, a security inspection instrument operator needs to manually select and assign a manual inspection station; when the passenger flow increases, it is impossible to dynamically increase the manual inspection personnel and remote image review personnel; and when there are a plurality of security inspection instruments working at the same time (a plurality of security inspection passages), a manual inspection station and an image interpretation station may not be reused. Therefore, a checking method and an apparatus based on a millimeter wave security inspection device are needed to solve the above problems.

SUMMARY

According to a first aspect of the present disclosure, there is provided a server for a checking system based on a millimeter wave security inspection device, connected to a security inspection instrument through a switching system, the server includes a memory and a processor, the memory stores instructions, and the instructions, when executed by the processor, cause the processor to:

receive a scanned image of an object and an ATR image interpretation result of the object from the security inspection instrument, wherein the ATR image interpretation result is obtained by the security inspection instrument performing an automatic threat recognition ATR image interpretation on the scanned image, and perform a manual inspection task on the object and perform an image interpretation task on the scanned image according to a working mode, wherein the working mode indicates whether the checking system is provided with a manual inspection station and an image interpretation station.

In an embodiment, the processor is further configured to: determine not to perform the manual inspection task on the object and not to perform the image interpretation task on the scanned image, and store the scanned image and the ATR image interpretation result, when the working mode indicates that the checking system is not provided with a manual inspection station and an image interpretation station.

In an embodiment, the processor is further configured to: determine whether there are available manual inspection stations in the checking system, when the working mode indicates that the checking system is provided with a manual inspection station but is not provided with an image interpretation station, and assign the manual inspection task for the object, the scanned image and the ATR image interpretation result to one manual inspection station selected from the available manual inspection stations, when it is determined that there are available manual inspection stations in the checking system, transmit information of the selected manual inspection station to the security inspection instrument, and receive a manual inspection result from the manual inspection station, wherein the manual inspection result is generated by the manual inspection station performing a manual inspection on the object according to the scanned image and the ATR image interpretation result in response to receiving the assigned manual inspection task.

In an embodiment, the processor is further configured to:

transmit a local manual inspection request to the security inspection instrument, when it is determined that there is no available manual inspection station in the checking system, assign a manual inspection task for the object to the security inspection instrument, when a positive confirmation response message is received from the security inspection instrument, wherein the positive confirmation response message is generated by the security inspection instrument when it is determined that the security inspection instrument is currently available, in response to receiving the local manual inspection request from the server, and receive a manual inspection result from the security inspection instrument, wherein the manual inspection result is generated by the security inspection instrument performing a manual inspection on the object according to the scanned image and the ATR image interpretation result in response to receiving the assigned manual inspection task.

In an embodiment, the processor is further configured to:

assign the image interpretation task for the scanned image, the scanned image and the ATR image interpretation result to one image interpretation station of at least one image interpretation station, when the working mode indicates that the checking system is not provided with a manual inspection station but is provided with an image interpretation station, and receive a second image interpretation result from the assigned image interpretation station, wherein the second image interpretation result is generated by the image interpretation station performing an image interpretation on the scanned image according to the ATR image interpretation result in response to receiving the assigned image interpretation task.

In an embodiment, the processor is further configured to:

assign the image interpretation task for the scanned image, the scanned image and the ATR image interpretation result to one image interpretation station of at least one image interpretation station, when the working mode indicates that the checking system is provided with a manual inspection station and is provided with an image interpretation station, receive a second image interpretation result from the assigned image interpretation station, wherein the second image interpretation result is generated by the image interpretation station performing an image interpretation on the scanned image according to the ATR image interpretation result in response to receiving the assigned image interpretation task, determine whether there are available manual inspection stations in the checking system, and assign the manual inspection task for the object, the scanned image and the second image interpretation result to one manual inspection station selected from the available manual inspection stations, when it is determined that there are available manual inspection stations in the checking system, transmit information of the selected manual inspection station to the security inspection instrument, and receive a manual inspection result from the manual inspection station, wherein the manual inspection result is generated by the manual inspection station performing a manual inspection on the object according to the scanned image and the second image interpretation result in response to receiving the assigned manual inspection task.

In an embodiment, the processor is further configured to:

transmit a local manual inspection request to the security inspection instrument, when it is determined that there is no available manual inspection station in the checking system, assign a manual inspection task for the object and the second image interpretation result to the security inspection instrument, when a positive confirmation response message is received from the security inspection instrument, wherein the positive confirmation response message is generated by the security inspection instrument, when it is determined that the security inspection instrument is currently available, in response to receiving the local manual inspection request from the server, and receive a manual inspection result from the security inspection instrument, wherein the manual inspection result is generated by the security inspection instrument performing a manual inspection on the object according to the scanned image and the second image interpretation result in response to receiving the assigned manual inspection task.

In an embodiment, the manual inspection task for the object and the image interpretation task for the scanned image are performed simultaneously.

In an embodiment, the processor is further configured to: determine an available manual inspection station according to a predefined strategy.

In an embodiment, the predefined strategy includes at least one of: a manual inspection station designated by a user in manual inspection stations associated with the security inspection instrument, whether a gender of the object and a gender of an operator of the manual inspection station being the same, whether the manual inspection station being in a predetermined number of passages adjacent to the security inspection instrument, and whether the operator being idle.

In an embodiment, the processor is further configured to: select an image interpretation station from the at least one image interpretation station according to a predefined strategy.

In an embodiment, the predefined strategy includes at least one of: an image interpretation station designated by a user in image interpretation stations associated with the security inspection instrument, whether a gender of the object and a gender of an operator of the image interpretation station being the same, and whether the image interpretation station being idle.

According a second aspect of the present disclosure, there is provided a checking system based on a millimeter wave security inspection device, including:

a server according to the first aspect;

a switching system, configured to perform a data communication; and a security inspection instrument, connected to the server through the switching system, and configured to scan an object to obtain a scanned image, perform an automatic threat recognition (ATR) image interpretation on the scanned image to obtain an ATR image interpretation result, and upload the scanned image and the ATR image interpretation result to the server.

In an embodiment, the checking system further includes:

at least one manual inspection station, connected to the security inspection instrument and the server through the switching system, and configured to perform a manual inspection on the object, wherein the security inspection instrument is further configured to:

determine whether the security inspection instrument is currently available in response to receiving a local manual inspection request from the server, transmit a positive confirmation response message to the server, when the security inspection instrument is currently available, and transmit a negative confirmation response message to the server, when the security inspection instrument is currently unavailable, and perform a manual inspection on the object according to the scanned image and the ATR image interpretation result in response to receiving the assigned manual inspection task, and transmit a manual inspection result to the server.

In an embodiment, the checking system further includes:

at least one manual inspection station, connected to the security inspection instrument and the server through the switching system, and configured to perform a manual inspection on the object, and at least one image interpretation station, connected to the security inspection instrument and the server through the switch system, and configured to perform an image interpretation on the scanned image, wherein the security inspection instrument is further configured to:

determine whether the security inspection instrument is currently available in response to receiving a local manual inspection request from the server, transmit a positive confirmation response message to the server, when the security inspection instrument is currently available, and transmit a negative confirmation response message to the server, when the security inspection instrument is currently unavailable, and perform a manual inspection on the object according to the scanned image and a second image interpretation result in response to receiving the assigned manual inspection task, and transmit a manual inspection result to the server, wherein the second image interpretation result is generated by the image interpretation station performing an image interpretation on the scanned image according to the ATR image interpretation result in response to receiving the assigned image interpretation task.

According to a third aspect of the present disclosure, there is provided a checking method using the server for a checking system based on a millimeter wave security inspection device according to the first aspect, including:

receiving a scanned image of an object and an ATR image interpretation result of the object by the server from the security inspection instrument, wherein the ATR image interpretation result is obtained by the security inspection instrument performing an automatic threat recognition ATR image interpretation on the scanned image, and performing a manual inspection task on the object and performing an image interpretation task on the scanned image by the server according to a working mode, wherein the working mode indicates whether the checking system is provided with a manual inspection station and an image interpretation station.

In an embodiment, the performing a manual inspection task on the object and performing an image interpretation task on the scanned image by the server according to a working mode includes:

determining by the server not to perform the manual inspection task on the object and not to perform the image interpretation task on the scanned image, and storing the scanned image and the ATR image interpretation result, when the working mode indicates that the checking system is not provided with a manual inspection station and an image interpretation station.

In an embodiment, the performing a manual inspection task on the object and performing an image interpretation task on the scanned image by the server according to a working mode includes:

determining by the server whether there are available manual inspection stations in the checking system, when the working mode indicates that the checking system is provided with a manual inspection station but is not provided with an image interpretation station, and, assigning the manual inspection task for the object, the scanned image and the ATR image interpretation result to one manual inspection station selected from the available manual inspection stations, when it is determined that there are available manual inspection stations in the checking system, transmitting information of the selected manual inspection station to the security inspection instrument, and receiving a manual inspection result from the manual inspection station, wherein the manual inspection result is generated by the manual inspection station performing a manual inspection on the object according to the scanned image and the ATR image interpretation result in response to receiving the assigned manual inspection task.

In an embodiment, the performing a manual inspection task on the object and performing an image interpretation task on the scanned image by the server according to a working mode includes:

transmitting by the server a local manual inspection request to the security inspection instrument, when it is determined by the server that there is no available manual inspection station in the checking system, assigning by the server a manual inspection task for the object to the security inspection instrument, when a positive confirmation response message is received from the security inspection instrument, wherein the positive confirmation response message is generated by the security inspection instrument when it is determined that the security inspection instrument is currently available, in response to receiving the local manual inspection request from the server, and receiving a manual inspection result from the security inspection instrument, wherein the manual inspection result is generated by the security inspection instrument performing a manual inspection on the object according to the scanned image and the ATR image interpretation result in response to receiving the assigned manual inspection task.

In an embodiment, the performing a manual inspection task on the object and performing an image interpretation task on the scanned image by the server according to a working mode includes:

assigning the image interpretation task for the scanned image, the scanned image and the ATR image interpretation result to one image interpretation station of at least one image interpretation station, when the working mode indicates that the checking system is not provided with a manual inspection station but is provided with an image interpretation station, and receiving a second image interpretation result from the assigned image interpretation station, wherein the second image interpretation result is generated by the image interpretation station performing an image interpretation on the scanned image according to the ATR image interpretation result in response to receiving the assigned image interpretation task.

In an embodiment 6, the performing a manual inspection task on the object and performing an image interpretation task on the scanned image by the server according to a working mode includes:

assigning the image interpretation task for the scanned image, the scanned image and the ATR image interpretation result to one image interpretation station of at least one image interpretation station, when the working mode indicates that the checking system is provided with a manual inspection station and is provided with an image interpretation station, receiving a second image interpretation result from the assigned image interpretation station, determining whether there are available manual inspection stations in the checking system, and assigning the manual inspection task for the object, the scanned image and the second image interpretation result to one manual inspection station selected from the available manual inspection stations, when it is determined that there are available manual inspection stations in the checking system, wherein the second image interpretation result is generated by the image interpretation station performing an image interpretation on the scanned image according to the ATR image interpretation result in response to receiving the assigned image interpretation task, transmitting information of the selected manual inspection station to the security inspection instrument, and receiving a manual inspection result from the manual inspection station, wherein the manual inspection result is generated by the manual inspection station performing a manual inspection on the object according to the scanned image and the second image interpretation result in response to receiving the assigned manual inspection task.

In an embodiment, the performing a manual inspection task on the object and performing an image interpretation task on the scanned image by the server according to a working mode includes:

transmitting a local manual inspection request to the security inspection instrument, when it is determined that there is no available manual inspection station in the checking system, assigning a manual inspection task for the object and the second image interpretation result to the security inspection instrument, when a positive confirmation response message is received from the security inspection instrument, wherein the positive confirmation response message is generated by the security inspection instrument when it is determined that the security inspection instrument is currently available, in response to receiving the local manual inspection request from the server, and receiving a manual inspection result from the security inspection instrument, wherein the manual inspection result is generated by the security inspection instrument performing a manual inspection on the object according to the scanned image and the second image interpretation result in response to receiving the assigned manual inspection task.

In an embodiment, the manual inspection task for the object and the image interpretation task for the scanned image are performed simultaneously.

In an embodiment, an available manual inspection station is determined according to a predefined strategy.

In an embodiment, the predefined strategy includes at least one of: a manual inspection station designated by a user in manual inspection stations associated with the security inspection instrument, whether a gender of the object and a gender of an operator of the manual inspection station being the same, whether the manual inspection station being in a predetermined number of passages adjacent to the security inspection instrument, and whether the operator being idle.

In an embodiment, the assigning the image interpretation task for the scanned image, the scanned image and the ATR image interpretation result to one image interpretation station of at least one image interpretation station includes:

selecting an image interpretation station from the at least one image interpretation station according to a predefined strategy.

In an embodiment, the predefined strategy includes at least one of: an image interpretation station designated by a user in image interpretation stations associated with the security inspection instrument, whether a gender of the object and a gender of an operator of the image interpretation station being the same, and whether the image interpretation station being idle.

BRIEF DESCRIPTION OF THE DRAWINGS

The above and other objectives, features and advantages of the present disclosure will be more clearly described through the following description of the embodiments of the present disclosure with reference to the accompanying drawings, in which.

The drawings do not show all circuits or structures of the embodiments. A same reference sign refers to a same or similar component or feature throughout the drawings.

DETAILED DESCRIPTION OF EMBODIMENTS

Hereinafter, the embodiments of the present disclosure will be described with reference to the accompanying drawings. It should be understood, however, that these descriptions are exemplary only, and are not intended to limit the scope of the present disclosure. In addition, in the following illustration, descriptions of commonly known structures and technologies are omitted to avoid unnecessarily obscuring the concept of the present disclosure.

The terms used herein are only for the purpose of describing particular embodiments, and are not intended to limit the present disclosure. The words "a/an", "one" and "this" used herein should also include the meanings of "plurality" and "multiple", unless the context clearly indicates otherwise. In addition, the terms such as "comprise/include" and "contain" used herein indicate an existence of a feature, a step, an operation and/or a component, but do not exclude an existence or an addition of one or more other features, steps, operations or components.

All terms (including technical and scientific terms) used herein have the meaning commonly understood by those of ordinary skill in the art, unless otherwise defined. It should be noted that the terms used herein should be interpreted as having meanings consistent with those in the context of the present specification, and should not be interpreted in an idealized or overly rigid manner.

Figure 1:
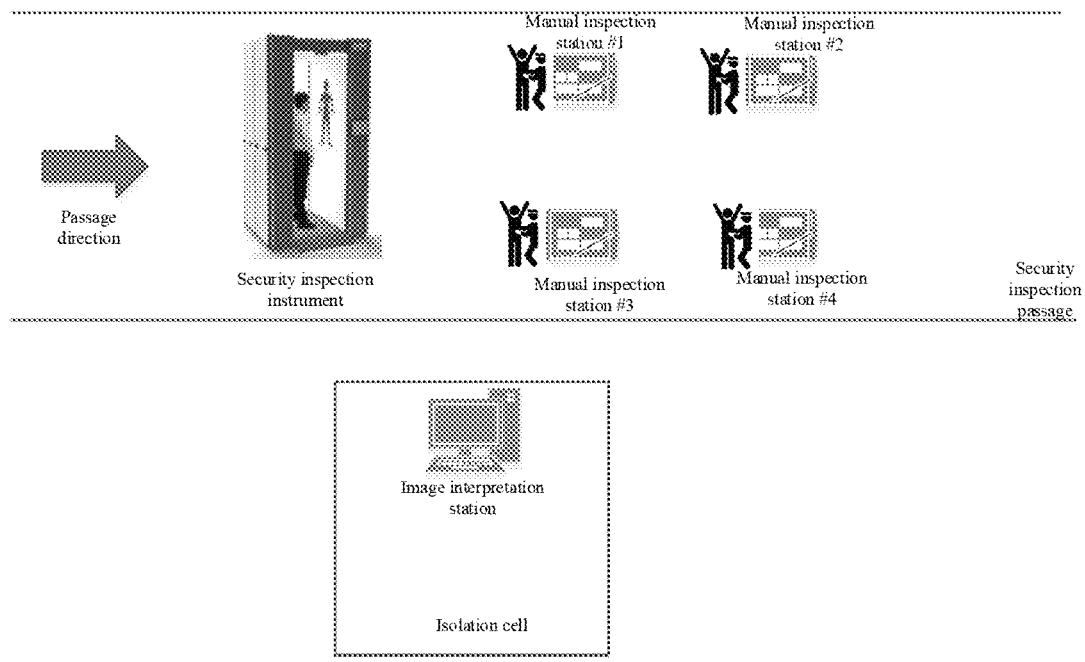
FIG. 1 shows a schematic diagram of a checking system based on a millimeter wave security inspection device according to the related art.
Figure 2:
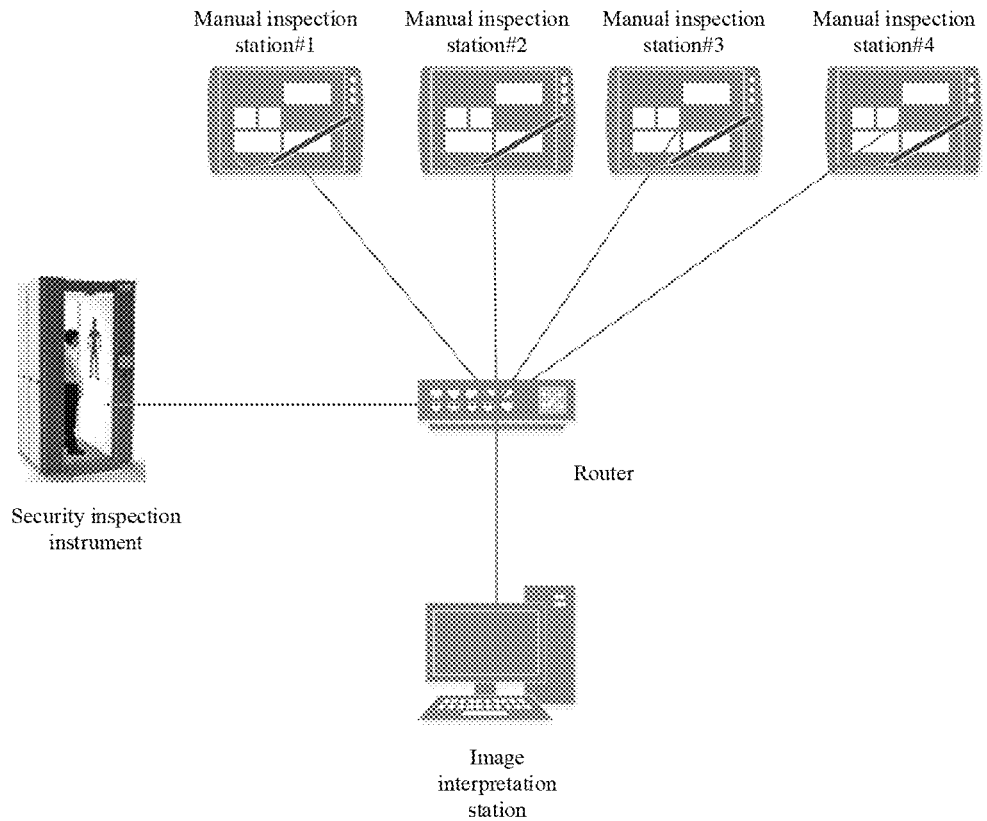
FIG. 2 shows a schematic diagram of another checking system based on a millimeter wave security inspection device according to the related art.

At present, the working manner of a millimeter wave security checking system is also usually based on a method similar to "metal door+manual inspection" (as shown in FIG. 1 and FIG. 2). A passenger is scanned by a millimeter wave security inspection device. The security inspection instrument detects a dangerous object using an automatic recognition algorithm, and then the object is directly displayed on the screen of the security inspection instrument in a form of an original scanned image or a cartoon image (based on privacy considerations). The passenger then goes to a fixed manual inspector for a manual inspection. When there is a privacy requirement but a further check of the original image is required, a fixed computer is arranged in an environment isolated from the security inspection site, and is remotely connected to the device terminal to display the scanned image.

Figure 3:
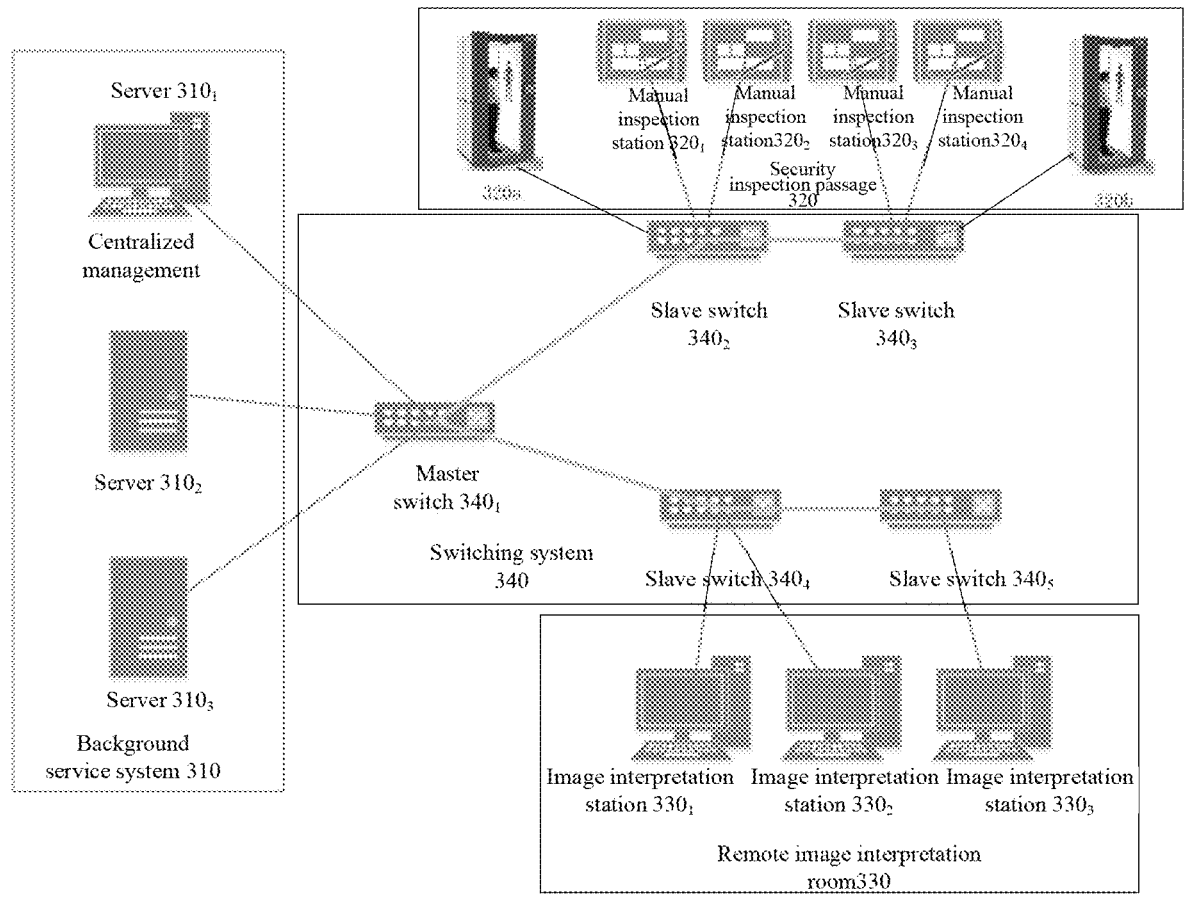
FIG. 3 shows a schematic diagram of a checking system based on a millimeter wave security inspection device according to an embodiment of the present disclosure.

FIG. 3 shows a schematic diagram of a checking system based on a millimeter wave security inspection device according to an embodiment of the present disclosure. The checking system may include a background server system 310, a security inspection passage 320, a remote image interpretation room 330 and a switching system 340. The background server system 310 may include at least one server, for example, a server $310_1$, $310_2$ and $310_3$. The security inspection passage 320 may include at least one security inspection instrument (such as a security inspection instrument 320a and 320b) and at least one manual inspection station (such as a manual inspection station $320_1$, $320_2$, $320_3$ and $320_4$). The remote image interpretation room 330 may include at least one image interpretation station, such as an image interpretation station $330_1$, $330_2$ and $330_3$. The switching system 340 may include a master switch (such as a master switch $340_1$) and a plurality of slave switches (such as slave switches $340_2$, $340_3$, $340_4$, and $340_5$). The security inspection instruments 320a and 320b, the manual inspection stations $320_1$, $320_2$, $320_3$ and $320_4$, and the image interpretation stations $330_1$, $330_2$ and $330_3$ may be connected to the background server system 310 through the switching system 340. It should be noted that the numbers of the servers, the security inspection instruments, the image interpretation stations and the switches are not limited to the numbers shown in the figure, and those skilled in the art may make a setting as required. In addition, it should also be noted that in the checking system there may be no manual inspection station and image interpretation station, that is, the security inspection passage 320 may only include security inspection instruments, and there may be no remote image interpretation room 330.

Figure 4:
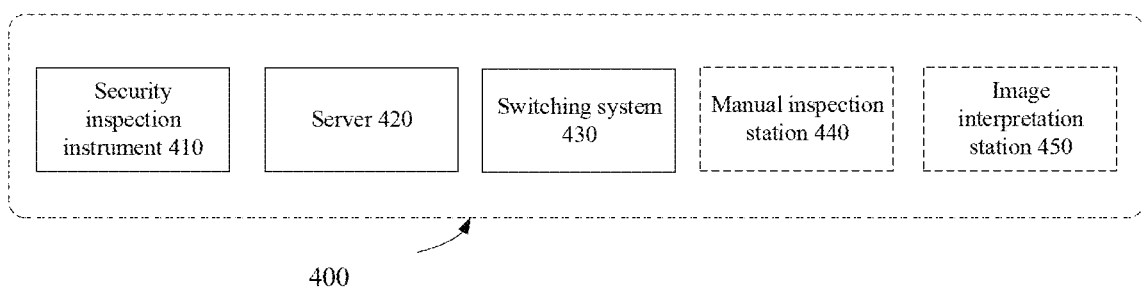
FIG. 4 shows a block diagram of a checking system based on a millimeter wave security inspection device according to an embodiment of the present disclosure.

The checking system will be described below by taking one server and one security inspection instrument as an example with reference to FIG. 4. FIG. 4 shows a block diagram of a checking system 400 based on a millimeter wave security inspection device according to an embodiment of the present disclosure. The checking system 400 may include a security inspection instrument 410, a server 420 and a switching system 430. The security inspection instrument 410 may be configured to scan an object (such as a person and an article) to obtain a scanned image, perform an automatic threat recognition ATR image interpretation on the scanned image to obtain an ATR image interpretation result, and upload the scanned image and the ATR image interpretation result to the server 420. The server 420 may be connected to the security inspection instrument 410 through the switching system 430 and may be configured to receive a scanned image and an ATR image interpretation result from the security inspection instrument 410, and perform a manual inspection task on the object and perform an image interpretation task on the scanned image according to a working mode, wherein the working mode indicates whether the checking system 400 is provided with a manual inspection station and an image interpretation station. The manual inspection task for the object and the image interpretation task for the scanned image are performed simultaneously. The working mode may be classified into four working modes, that is, a first working mode: the checking system 400 is not provided with a manual inspection station and an image interpretation station; a second working mode: the checking system 400 is provided with a manual inspection station but is not provided an image interpretation station; a third working mode: the checking system 400 is not provided with a manual inspection station but is provided with an image interpretation station; and a fourth work mode: the checking system 400 is provided with a manual inspection station and an image interpretation station. Operations of the server and the security inspection instrument will be described according to the four different working modes in the following.

In an embodiment, the server 420 may be further configured to: determine not to perform the manual inspection task on the object and not to perform the image interpretation task on the scanned image, and store the scanned image and the ATR image interpretation result, when the working mode indicates that the checking system 400 is not provided with a manual inspection station and an image interpretation station, i.e., when the checking system 400 is in the first working mode. The ATR image interpretation result may indicate that there is a suspicious object in the scanned image or may indicate that there is no suspicious object in the scanned image.

In an embodiment, the checking system 400 further includes: at least one manual inspection station 440, connected to the security inspection instrument 410 and the server 420 through the switching system 430. The security inspection instrument 420 may be further configured to: determine whether there is an available manual inspection station in the checking system 400, when the working mode indicates that the checking system 400 is provided with a manual inspection station but is not provided an image interpretation station, i.e., the checking system 400 is in the second working mode, and assign the manual inspection task for the object, the scanned image and the ATR image interpretation result to one manual inspection station selected from the available manual inspection stations, when it is determined that there is an available manual inspection station in the checking system 400, transmit information of the selected manual inspection station to the security inspection instrument 410, and receive a manual inspection result from the manual inspection station 440, wherein the manual inspection result is generated by the manual inspection station 440 performing a manual inspection on the object according to the scanned image and the ATR image interpretation result in response to receiving the assigned manual inspection task. Such manual inspection result may indicate that the object is carrying a suspicious article or may indicate that the object is not carrying a suspicious article. It should be noted that when the security inspection instrument 410 receives the information of the assigned manual inspection station, the operator of the security inspection instrument 410 may guide the object to go to the assigned manual inspection station to wait for a manual inspection.

When the checking system 400 is in the second working mode, the server 420 may be further configured to: determine an available manual inspection station according to a predefined strategy. The predefined strategy includes at least one of: a manual inspection station designated by a user in manual inspection stations associated with the security inspection instrument 410, whether a gender of the object and a gender of an operator of the manual inspection station being the same, whether the manual inspection station being in a predetermined number of (for example, one or two) passages adjacent to the security inspection instrument, and whether the operator being idle. For example, an available manual inspection station needs to meet at least one of the following conditions: the manual inspection station being one of manual inspection stations #1, #2 and #3 designated by a user in manual inspection stations #1 to #10 associated with the security inspection instrument 410, a gender of the object and a gender of an operator of the manual inspection station being the same, the manual inspection station being in a predetermined number of (for example, one or two) passages adjacent to the security inspection instrument, and the operator being idle. It should be noted that there may be more than one manual inspection station meeting the predefined strategy, and in this case, a manual inspection station may be randomly selected, or a manual inspection station closest to the security inspection instrument 410 may be selected. It should also be noted that there may be no manual inspection station meeting the predefined strategy, i.e., there is no manual inspection station currently available, and at this time, a manual inspection station may be searched cyclically until there is a manual inspection station meeting the predefined strategy. Alternatively, the security inspection instrument 410 may be used to perform a manual inspection. In this case, when the checking system 400 is in the second working mode, the server 420 may be further configured to: transmit a local manual inspection request to the security inspection instrument 410, when it is determined that there is no available manual inspection station in the checking system 400, assign a manual inspection task for the object to the security inspection instrument 410, when a positive confirmation response message is received from the security inspection instrument 410, wherein the positive confirmation response message is generated by the security inspection instrument 410 in response to receiving the local manual inspection request from the server 420, when it is determined that the security inspection instrument 410 is currently available (for example, when the operator of the security inspection instrument allows the security inspection instrument to be used), and receive a manual inspection result from the security inspection instrument 410, wherein the manual inspection result is generated by the security inspection instrument 410 performing a manual inspection on the object according to the scanned image and the ATR image interpretation result in response to receiving the assigned manual inspection task. The security inspection instrument 410 is further configured to: determine whether the security inspection instrument 410 is currently available in response to receiving a local manual inspection request from the server 420, transmit a positive confirmation response message to the server 420, when the security inspection instrument 410 is currently available, and transmit a negative confirmation response message to the server 420, when the security inspection instrument 410 is currently unavailable, and perform a manual inspection on the object according to the scanned image and the ATR image interpretation result in response to receiving the assigned manual inspection task, and transmit a manual inspection result to the server 420.

In an embodiment, the checking system 400 may further include: at least one image interpretation station 450, connected to the security inspection instrument 410 and the server 420 through the switching system 430. The server 420 may be further configured to: assign the image interpretation task for the scanned image, the scanned image and the ATR image interpretation result to one image interpretation station of at least one image interpretation station 450, when the working mode indicates that the checking system 400 is not provided with a manual inspection station but is provided with an image interpretation station, i.e., when the checking system 400 is in the third working mode, and receive a second image interpretation result from the assigned image interpretation station, wherein the second image interpretation result is generated by the image interpretation station 450 performing an image interpretation on the scanned image according to the ATR image interpretation result in response to receiving the assigned image interpretation task. The image interpretation station 450 may be configured to: perform an image interpretation on the scanned image according to the ATR image interpretation result in response to receiving the assigned image interpretation task to obtain a second image interpretation result, and transmit the second image interpretation result to the server 420.

In an embodiment, the checking system 400 may further include: at least one manual inspection station 440 and at least one image interpretation station 450, which are connected to the security inspection instrument 410 and the server 420 through the switching system 430. The server 420 may be further configured to: assign the image interpretation task for the scanned image, the scanned image and the ATR image interpretation result to one image interpretation station of at least one image interpretation station 450, when the working mode indicates that the checking system 400 is provided with a manual inspection station and is provided with an image interpretation station, i.e., the checking system 400 is in the fourth working mode, receive a second image interpretation result from the assigned image interpretation station, wherein the second image interpretation result is generated by the image interpretation station 450 performing an image interpretation on the scanned image according to the ATR image interpretation result in response to receiving the assigned image interpretation task, determine whether there is an available manual inspection station in the checking system 400, and assign the manual inspection task for the object, the scanned image and the second image interpretation result to one manual inspection station selected from the available manual inspection stations 440, when it is determined that there is an available manual inspection station in the checking system 400, transmit information of the selected manual inspection station 440 to the security inspection instrument 410, and receive a manual inspection result from the manual inspection station 440, wherein the manual inspection result may be generated by the manual inspection station 440 performing a manual inspection on the object according to the scanned image and the second image interpretation result in response to receiving the assigned manual inspection task. The image interpretation station 450 may be configured to: perform an image interpretation on the scanned image according to the ATR image interpretation result in response to receiving the assigned image interpretation task to obtain a second image interpretation result, and transmit the second image interpretation result to the server 420. The manual inspection station 440 may be configured to: perform a manual inspection on the object according to the scanned image and the second image interpretation result in response to receiving the assigned manual inspection task, and transmit the manual inspection result to the server 420. It should be noted that when the security inspection instrument 410 receives the information of the assigned manual inspection station, the operator of the security inspection instrument 410 may guide the object to go to the assigned manual inspection station to wait for a manual inspection.

When the checking system 400 is in the fourth working mode, the server 420 may be further configured to: determine an available manual inspection station according to a predefined strategy. The predefined strategy may include at least one of: a manual inspection station designated by a user in manual inspection stations associated with the security inspection instrument 410, whether a gender of the object and a gender of an operator of the manual inspection station being the same, whether the manual inspection station being in a predetermined number of (for example, one or two) passages adjacent to the security inspection instrument, and whether the operator being idle. For example, an available manual inspection station needs to meet at least one of the following conditions: the manual inspection station being one of manual inspection stations #1, #2 and #3 designated by a user in manual inspection stations #1 to #10 associated with the security inspection instrument 410, a gender of the object and a gender of an operator of the manual inspection station being the same, the manual inspection station being in a predetermined number of (for example, one or two) passages adjacent to the security inspection instrument, and the operator being idle. It should be noted that there may be more than one manual inspection station meeting the predefined strategy, and in this case, a manual inspection station may be randomly selected, or a manual inspection station closest to the security inspection instrument may be selected. It should also be noted that there may be no manual inspection station meeting the predefined strategy, i.e., there is no manual inspection station currently available, and at this time, a manual inspection station may be searched cyclically until there is a manual inspection station meeting the predefined strategy. Alternatively, the security inspection instrument 410 may be used to perform a manual inspection. In this case, when the checking system 400 is in the fourth working mode, the server 420 may be further configured to: transmit a local manual inspection request to the security inspection instrument 410, when it is determined that there is no available manual inspection station in the checking system 400, assign a manual inspection task for the object and the second image interpretation result to the security inspection instrument 410, when a positive confirmation response message is received from the security inspection instrument 410, wherein the positive confirmation response message is generated by the security inspection instrument 410 in response to receiving the local manual inspection request from the server 420, when it is determined that the security inspection instrument 410 is currently available, and receive a manual inspection result from the security inspection instrument 410, wherein the manual inspection result is generated by the security inspection instrument 410 performing a manual inspection on the object according to the scanned image and the second image interpretation result in response to receiving the assigned manual inspection task. The security inspection instrument 410 may be further configured to: determine whether the security inspection instrument 410 is currently available in response to receiving a local manual inspection request from the server 420, transmit a positive confirmation response message to the server 420, when the security inspection instrument 410 is currently available (for example, when the operator of the security inspection instrument allows the security inspection instrument to be used), and transmit a negative confirmation response message to the server 420, when the security inspection instrument 410 is currently unavailable, and perform a manual inspection on the object according to the scanned image and the second image interpretation result in response to receiving the assigned manual inspection task, and transmit a manual inspection result to the server 420.

When the checking system 400 is in the third working mode or the fourth working mode, the server 420 may be further configured to: select an image interpretation station from the at least one image interpretation station 450 according to a predefined strategy. The predefined strategy includes at least one of: an image interpretation station designated by a user in image interpretation stations 450 associated with the security inspection instrument 410, whether a gender of the object and a gender of an operator of the image interpretation station being the same, and whether the image interpretation station 450 being idle. For example, the selected image interpretation station needs to meet at least one of the following conditions: the image interpretation station being one of image interpretation stations #1, #2 and #3 designated by a user in image interpretation stations #1 to #10 associated with the security inspection instrument 410, a gender of the object and a gender of an operator of the image interpretation station being the same, and the image interpretation station being idle. It should be noted that there may be more than one image interpretation station meeting the predefined strategy, and in this case, an image interpretation station may be randomly selected. It should also be noted that there may be no image interpretation station meeting the predefined strategy, i.e., there is no image interpretation station currently available, and at this time, an image interpretation station may be searched cyclically within a predetermined time until the predetermined time expires. If an image interpretation station meeting the conditions is not found when the predetermined time expires, the search is no longer continued, and an image interpretation result is directly provided. Such image interpretation result may be an ATR image interpretation result provided by security inspection instrument 410, or may be an image interpretation result indicating that there is a suspicious article in the scanned image. In addition, when an image interpretation is performed at an image interpretation station, a timing may also be performed. When a time of an image interpretation expires, an image interpretation result is directly provided. Such image interpretation result may also be an ATR image interpretation result provided by security inspection instrument 410, or may be an image interpretation result indicating that there is a suspicious article in the scanned image.

With the embodiments of the present disclosure, all security inspection instruments, manual inspection stations, and image interpretation stations are connected to a background service system. The background service system may store service data such as scanned images, image interpretation results, and manual inspection results, and may distribute and uniformly inquire the service data. After a scanning of an object is completed, the background service system automatically assigns a manual inspection station and an image interpretation station according to a set assignment strategy, so that the manual inspection station and the remote image interpretation station may be reused. Moreover, when the traffic of objects changes, numbers of manual inspection stations and remote image interpretation stations may be dynamically adjusted.

Figure 5:
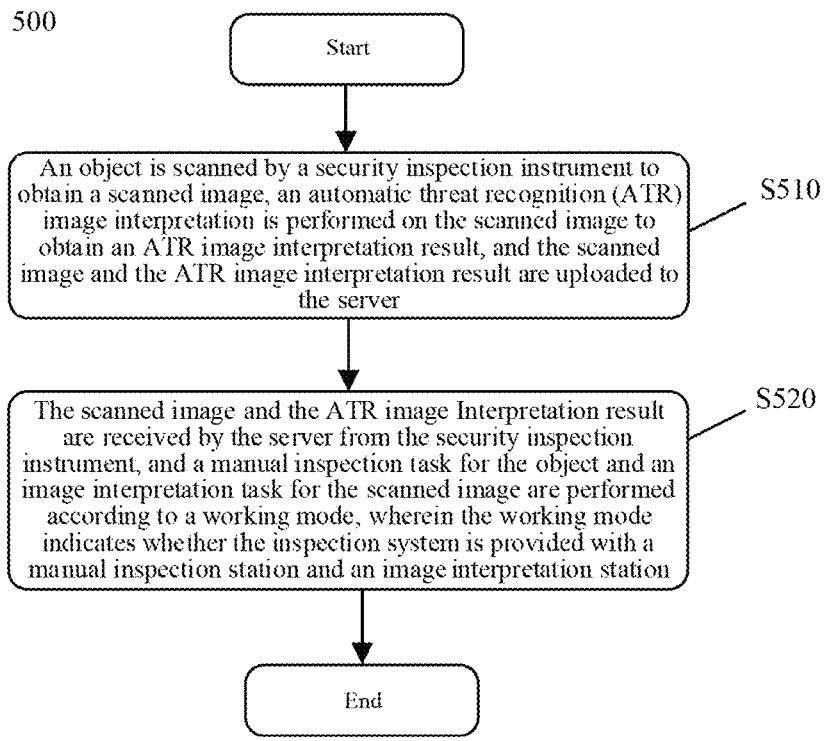
FIG. 5 shows a flow chart of a method for performing an inspection using a checking system based on a millimeter wave security inspection device according to an embodiment of the present disclosure.

FIG. 5 shows a flow chart of a method 500 for performing an inspection using the checking system 400 based on a millimeter wave security inspection device according to an embodiment of the present disclosure. The method 500 includes the following steps.

In step S510, an object may be scanned by a security inspection instrument 410 to obtain a scanned image, an automatic threat recognition (ATR) image interpretation is performed on the scanned image to obtain an ATR image interpretation result, and the scanned image and the ATR image interpretation result are uploaded to the server 420.

In step S520, the scanned image and the ATR image interpretation result may be received by the server 420 from the security inspection instrument 410, and a manual inspection task for the object and an image interpretation task for the scanned image may be performed according to a working mode, wherein the working mode indicates whether the checking system 400 is provided with a manual inspection station and an image interpretation station. The working mode may be classified into four working modes, that is, a first working mode: the checking system 400 is not provided with a manual inspection station and an image interpretation station; a second working mode: the checking system 400 is provided with a manual inspection station but is not provided an image interpretation station; a third working mode: the checking system 400 is not provided with a manual inspection station but is provided with an image interpretation station; and a fourth work mode: the checking system 400 is provided with a manual inspection station and an image interpretation station.

With the embodiments of the present disclosure, after a scanning of an object is completed, the background service system automatically assigns a manual inspection station and an image interpretation station according to a set assignment strategy, so that the manual inspection station and the remote image interpretation station may be reused. Moreover, when the traffic of objects changes, numbers of manual inspection stations and remote image interpretation stations may be dynamically adjusted.

Operations of the checking method will be described below according to four different working modes with reference to FIG. 6 to FIG. 9.

Figure 6:
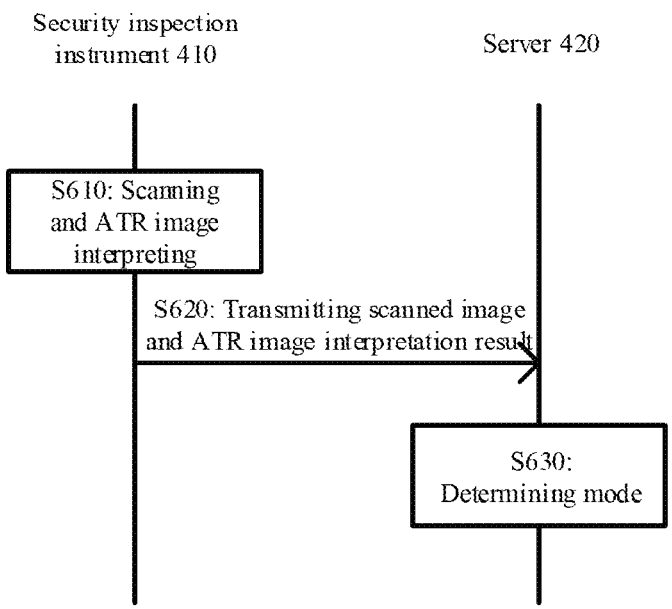
FIG. 6 shows a flow chart of a method for performing an inspection using a checking system based on a millimeter wave security inspection device according to a first embodiment of the present disclosure.

FIG. 6 shows a flow chart of a method for performing an inspection using the checking system 400 based on a millimeter wave security inspection device according to a first embodiment of the present disclosure.

In step S610, an object may be scanned by a security inspection instrument 410 to obtain a scanned image, and an automatic threat recognition (ATR) image interpretation is performed on the scanned image to obtain an ATR image interpretation result. In step S620, the scanned image and the ATR image interpretation result may be uploaded to a server 420 by the security inspection instrument 410. In step S630, a working mode may be determined by the server 420, and when the working mode indicates that the checking system 400 is not provided with a manual inspection station and an image interpretation station, i.e., when the checking system 400 is in the first working mode, it may be determined by the server 420 not to perform a manual inspection task on the object and not to perform an image interpretation task on the scanned image, and the scanned image and the ATR image interpretation result may be stored.

Figure 7:
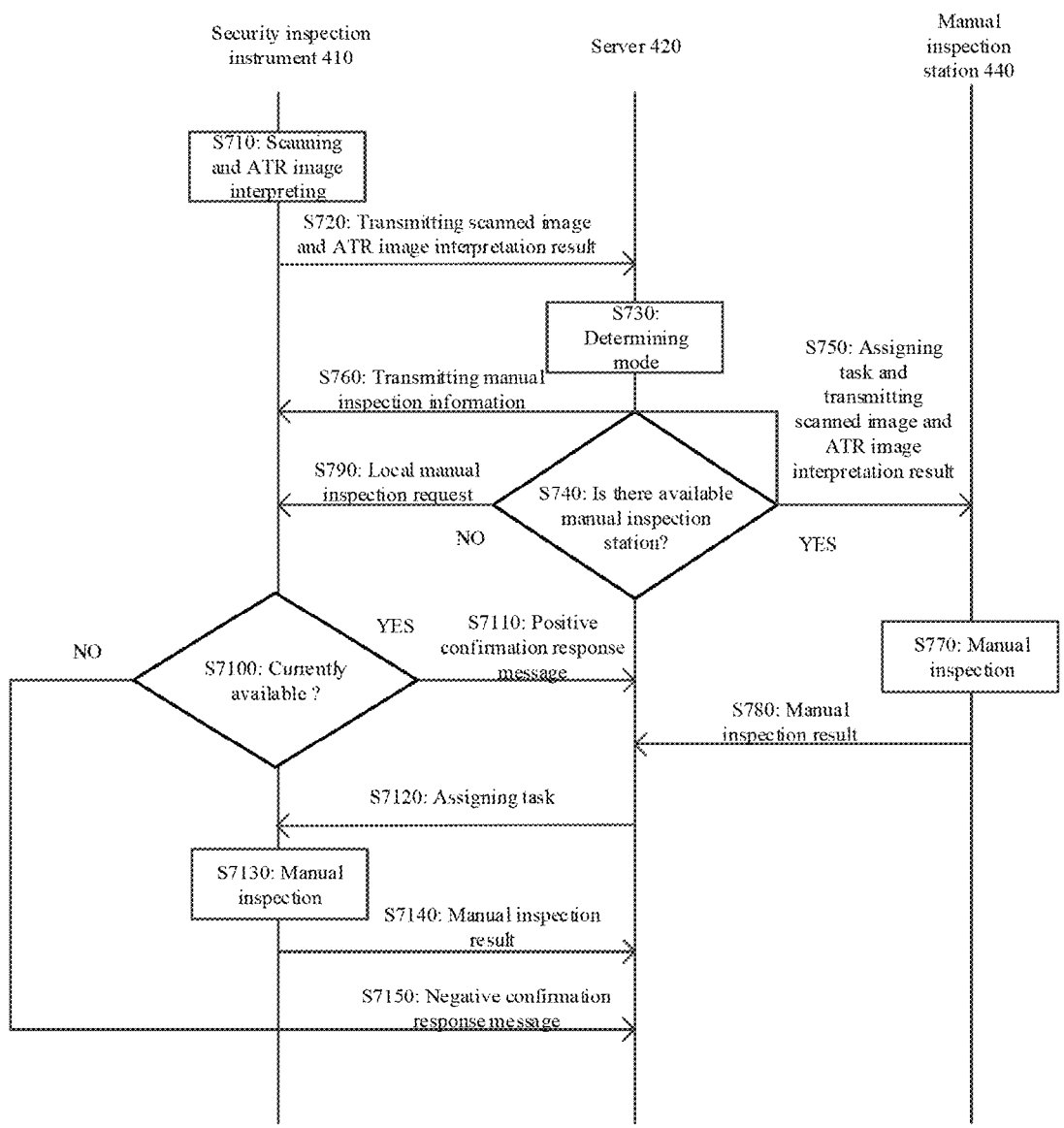
FIG. 7 shows a flow chart of a method for performing an inspection using a checking system based on a millimeter wave security inspection device according to a second embodiment of the present disclosure.

FIG. 7 shows a flow chart of a method for performing an inspection using the checking system 400 based on a millimeter wave security inspection device according to a second embodiment of the present disclosure.

In step S710, an object may be scanned by a security inspection instrument 410 to obtain a scanned image, and an automatic threat recognition (ATR) image interpretation is performed on the scanned image to obtain an ATR image interpretation result. In step S720, the scanned image and the ATR image interpretation result may be uploaded to a server 420 by the security inspection instrument 410. In step S730, a working mode may be determined by the server 420. When the working mode indicates that the checking system 400 is provided with a manual inspection station but is not provided with an image interpretation station, i.e., when the checking system 400 is in the second working mode, in step S740, it may be determined by the server 420 whether there is an available manual inspection station 440 in the checking system 400. In step S740, when it is determined that there is an available manual inspection station in the checking system 400, in step S750, the manual inspection task for the object, the scanned image, and the ATR image interpretation result may be transmitted by the server 420 to one manual inspection station 440 selected from the available manual inspection stations, and in step S760, information of the selected manual inspection station may be transmitted to the security inspection instrument 410 by the server 420. In step S770, a manual inspection may be performed on the object according to the scanned image and the ATR image interpretation result by the manual inspection station 440 in response to receiving the assigned manual inspection task. In step S780, the manual inspection result may be transmitted to the server 420 by the manual inspection station 440. In step S740, when it is determined that there is no available manual inspection station in the checking system 400, in step S790, a local manual inspection request may be transmitted by the server 420 to the security inspection instrument 410. After the local manual inspection request is received from the server 420, in step S7100, it may be determined by the security inspection instrument 410 whether the security inspection instrument 410 is currently available. In step S7100, when it is determined that the security inspection instrument 410 is currently available, in step S7110, a positive confirmation response message may be transmitted by the security inspection instrument 410 to the server 420. In step S7120, a manual inspection task for the object may be assigned by the server 420 to the security inspection instrument 410. In step S7130, a manual inspection may be performed on the object according to the scanned image and the ATR image interpretation result by the security inspection instrument 410 in response to receiving the assigned manual inspection task. In step S7140, the manual inspection result may be transmitted by the security inspection instrument 410 to the server 420. In step S7100, when it is determined that the security inspection instrument 410 is currently not available, in step S7150, a negative confirmation response message may be transmitted by the security inspection instrument 410 to the server 420.

Figure 8:
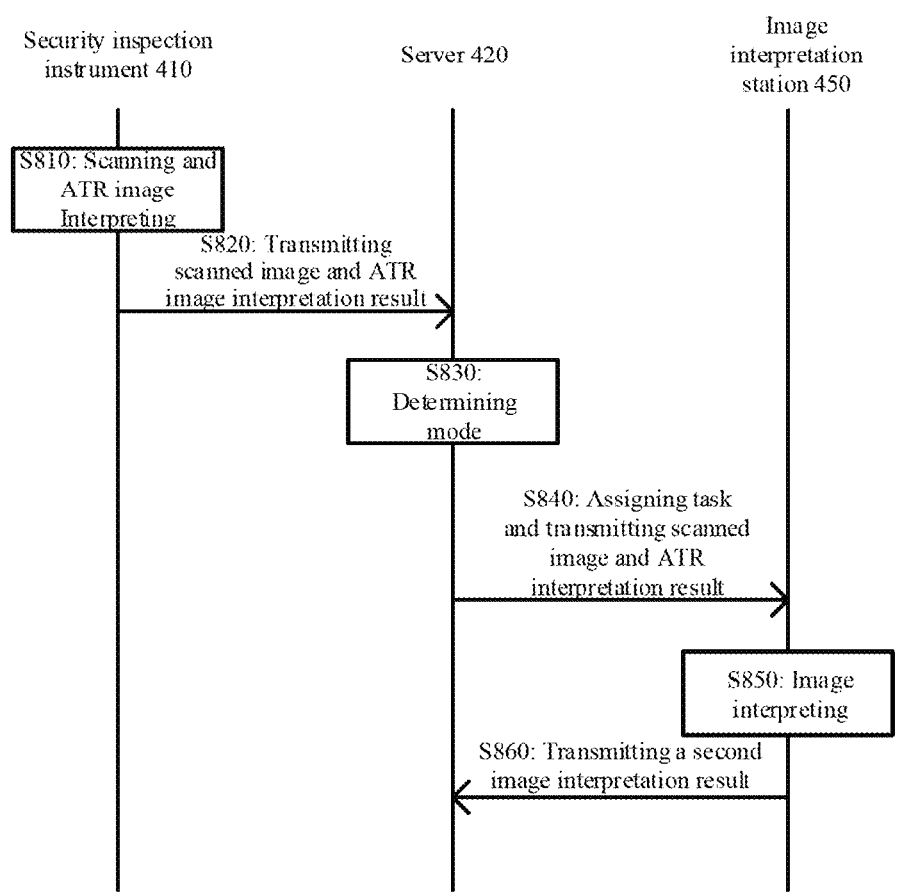
FIG. 8 shows a flow chart of a method for performing an inspection using a checking system based on a millimeter wave security inspection device according to a third embodiment of the present disclosure.

FIG. 8 shows a flow chart of a method for performing an inspection using the checking system 400 based on a millimeter wave security inspection device according to a third embodiment of the present disclosure.

In step S810, an object may be scanned by a security inspection instrument 410 to obtain a scanned image, and an automatic threat recognition (ATR) image interpretation is performed on the scanned image to obtain an ATR image interpretation result. In step S820, the scanned image and the ATR image interpretation result may be uploaded to a server 420 by the security inspection instrument 410. In step S830, a working mode may be determined by the server 420. When the working mode indicates that the checking system 400 is not provided with a manual inspection station but is provided with an image interpretation station, i.e., when the checking system 400 is in the third working mode, in step S840, the image interpretation task for the scanned image, the scanned image and the ATR image interpretation result may be assigned by the server 420 to one image interpretation station of at least one image interpretation station 450. In step S850, an image interpretation may be performed on the scanned image according to the ATR image interpretation result by an assigned image interpretation station 450 in response to receiving the assigned image interpretation task, so that a second image interpretation result is obtained. In step S860, the second image interpretation result may be transmitted by the assigned image interpretation station 450 to the server 420.

Figure 9:
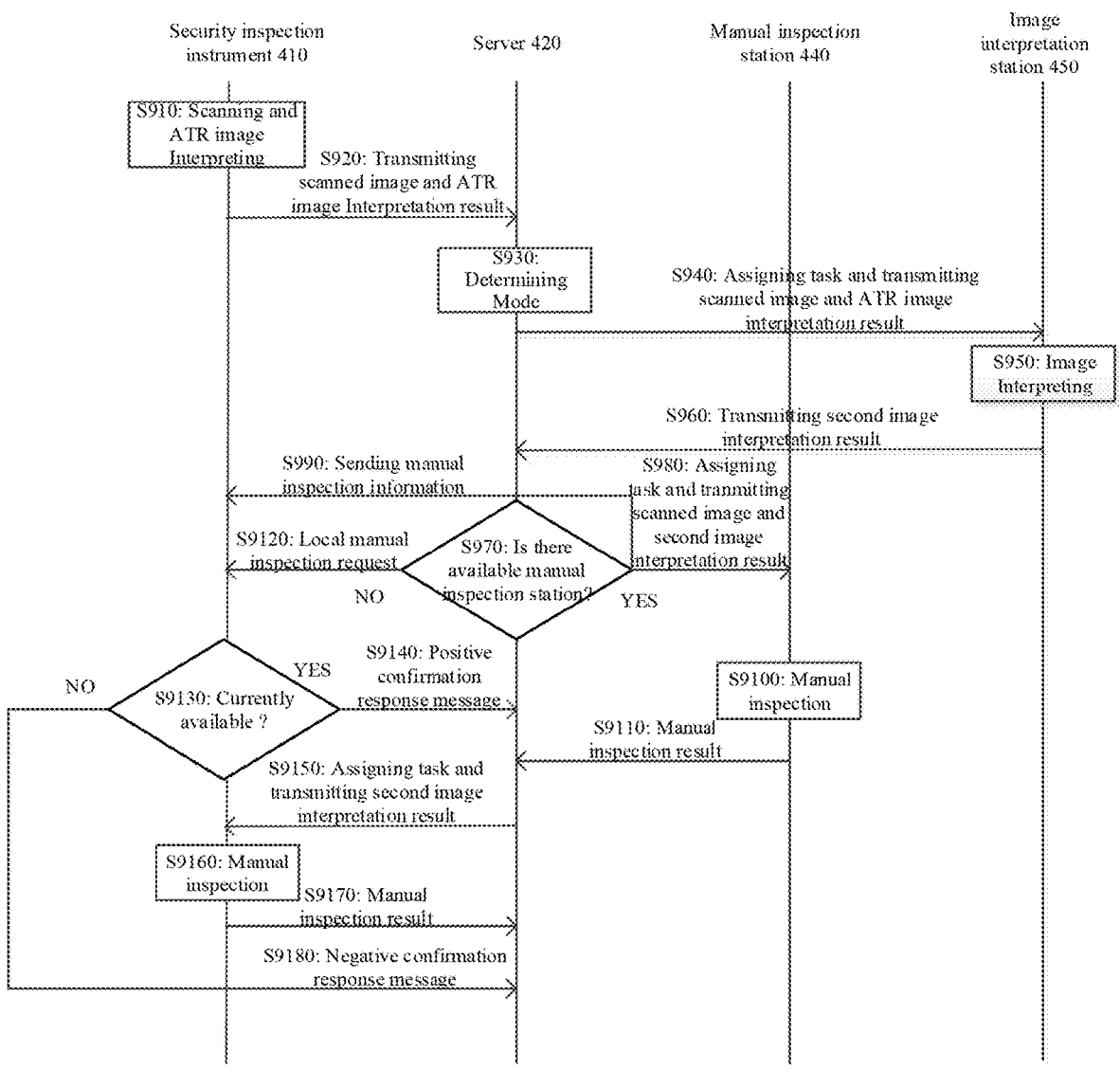
FIG. 9 shows a flow chart of a method for performing an inspection using a checking system based on a millimeter wave security inspection device according to a fourth embodiment of the present disclosure.

FIG. 9 shows a flow chart of a method for performing an inspection using the checking system 400 based on a millimeter wave security inspection device according to a fourth embodiment of the present disclosure.

In step S910, an object may be scanned by a security inspection instrument 410 to obtain a scanned image, and an automatic threat recognition (ATR) image interpretation is performed on the scanned image to obtain an ATR image interpretation result. In step S920, the scanned image and the ATR image interpretation result may be uploaded to a server 420 by the security inspection instrument 410. In step S930, a working mode may be determined by the server 420. When the working mode indicates that the checking system 400 is provided with a manual inspection station and is provided with an image interpretation station, i.e., when the checking system 400 is in the fourth working mode, in step S940, an image interpretation task for the scanned image, the scanned image, and the ATR image interpretation result may be assigned by the server 420 to one image interpretation station of at least one image interpretation station 450. In step S950, an image interpretation may be performed on the scanned image according to the ATR image interpretation result by an assigned image interpretation station 450 in response to receiving the assigned image interpretation task, so that a second image interpretation result is obtained. In step S960, the second image interpretation result may be transmitted to the server 420 by the assigned image interpretation station 450. In step S970, it may be determined by the server 420 whether there is an available manual inspection station 440 in the checking system 400. In step S970, when it is determined that there is an available manual inspection station in the checking system 400, in step S980, the manual inspection task for the object, the scanned image, and the second image interpretation result may be transmitted by the server 420 to one manual inspection station 440 selected from the available manual inspection stations, and in step S990, information of the selected manual inspection station may be transmitted to the security inspection instrument 410 by the server 420. In step S9100, a manual inspection may be performed on the object according to the scanned image and the second image interpretation result by the manual inspection station 440 in response to receiving the assigned manual inspection task. In step S9110, the manual inspection result may be transmitted to the server 420 by the manual inspection station 440. In step S970, when it is determined that there is no available manual inspection station in the checking system 400, in step S9120, a local manual inspection request may be transmitted by the server 420 to the security inspection instrument 410. After the local manual inspection request is received from the server 420, in step S9130, it may be determined by the security inspection instrument 410 whether the security inspection instrument 410 is currently available. In step S9130, when it is determined that the security inspection instrument 410 is currently available, in step S9140, a positive confirmation response message may be transmitted by the security inspection instrument 410 to the server 420. In step S9150, a manual inspection task for the object and the second image interpretation result may be assigned by the server 420 to the security inspection instrument 410. In step S9160, a manual inspection may be performed on the object according to the scanned image and the second image interpretation result by the security inspection instrument 410 in response to receiving the assigned manual inspection task. In step S9170, the manual inspection result may be transmitted by the security inspection instrument 410 to the server 420. In step S9130, when it is determined that the security inspection instrument 410 is currently not available, in step S9180, a negative confirmation response message may be transmitted by the security inspection instrument 410 to the server 420.

It should be noted that, in the embodiments of the present disclosure, the information transmission among the security inspection instrument, the server, the manual inspection station and the image interpretation station is all performed through a switching system. However, the present disclosure is not limited thereto, and the information transmission may also be implemented through other transmission mechanisms.

With the embodiments of the present disclosure, all security inspection instruments, manual inspection stations, and image interpretation stations are connected to a background service system. The background service system may store service data such as scanned images, image interpretation results, and manual inspection results, and may distribute and uniformly inquire the service data. After a scanning of an object is completed, the background service system automatically assigns a manual inspection station and an image interpretation station according to a set assignment strategy, so that the manual inspection station and the remote image interpretation station may be reused. Moreover, when the traffic of objects changes, numbers of manual inspection stations and remote image interpretation stations may be dynamically adjusted.

Figure 10:
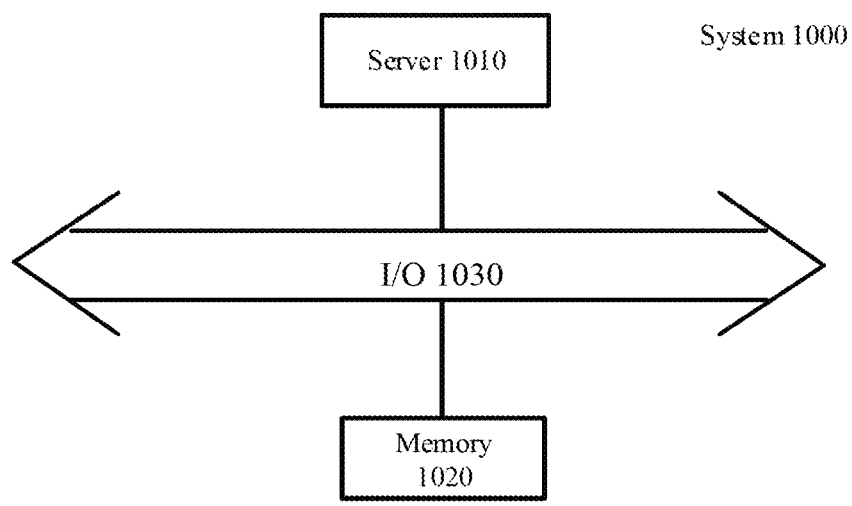
FIG. 10 shows a schematic diagram of a computer system according to an embodiment of the present disclosure.

FIG. 10 shows a schematic diagram of a computer system according to an embodiment of the present disclosure. A system 1000 may include a processor 1010, such as a digital signal processor (DSP). The processor 1010 may be a single device or multiple devices for performing various actions of the processes described in the present disclosure. The system 1000 may also include an input/output (I/O) device 1030 for receiving signals from or transmitting signals to other entities.

In addition, the system 1000 may include memory 1020. The memory 1020 may be in a form of a non-volatile or a volatile memory, such as an electrically erasable programmable read-only memory (EEPROM) and a flash memory. The memory 1020 may store computer readable instructions. When executed by the processor 1010, the computer readable instructions may cause the processor to perform the actions described in the present disclosure.

Some block diagrams and/or flowcharts are shown in the figures. It should be understood that some or combinations of the blocks in the block diagrams and/or flowcharts may be implemented by computer program instructions. These computer program instructions may be provided to a processor of a general purpose computer, a special purpose computer, or another programmable data processing device, so that these instructions, when executed by the processor, may create a device used to implement the functions/operations illustrated in these block diagrams and/or flowcharts.

Accordingly, the technology of the present disclosure may be implemented in a form of hardware and/or software (including firmware, microcode, etc.). Additionally, the technology of the present disclosure may take a form of a computer program product on a computer-readable medium having instructions stored thereon, and the computer program product may be used by or in connection with an instruction execution system (e.g., one or more processors). In the context of the present disclosure, a computer-readable medium is any medium that may contain, store, transmit, propagate or transmit instructions. For example, a computer readable medium may include, but is not limited to, an electrical, magnetic, optical, electromagnetic, infrared, or semiconductor system, apparatus, device, or propagation medium. Specific examples of a computer-readable media include: a magnetic storage, such as a magnetic tape or hard disk (HDD); an optical storage, such as an optical disc (CD-ROM); a memory, such as random access memory (RAM) or flash memory; and/or a wired/wireless communication link.

The above detailed description has set forth numerous embodiments of a checking method and a system based on a millimeter wave security inspection device, a server, and a computer system by using schematic diagrams, flowcharts, and/or examples. In a case that such schematic diagrams, flowcharts, and/or examples include one or more functions and/or operations, those skilled in the art should understand that each function and/or operation in such schematic diagrams, flowcharts, or examples may be separately and/or collectively implemented by various structures, hardware, software, firmware, or any substantial combination thereof. In one embodiment, several portions of the subject matter described in the embodiments of the present disclosure may be implemented by an application specific integrated circuit (ASIC), a field programmable gate array (FPGA), a digital signal processor (DSP), or another integrated format. However, those skilled in the art should recognize that some aspects of the embodiments disclosed herein may be equivalently implemented in whole or in part in an integrated circuit, implemented as one or more computer programs (e.g., implemented as one or more programs running on one or more computer systems) running on one or more computers, implemented as one or more programs running on one or more processors (e.g., implemented as one or more programs running on one or more microprocessors), implemented as firmware, or substantially implemented as any combination of the above manners, and those skilled in the art will have the ability to design a circuit and/or write software and/or firmware codes according to the present disclosure. Additionally, those skilled in the art will recognize that the mechanism of the subject matter described in the present disclosure may be distributed as various forms of program products and that regardless of the specific type of a signal bearing medium actually used to perform the distribution, the exemplary embodiments of the subject matter described in the present disclosure are applicable. Examples of a signal bearing medium include, but are not limited to: a recordable-type medium such as a floppy disk, a hard disk drive, a compact disc (CD), a digital versatile disc (DVD), a digital tape, a computer memory, etc.; and a transmission-type medium such as a digital and/or an analog communication medium (e.g., a fiber optic cable, a waveguide, a wired communication link, a wireless communication links, etc.).

What is claimed is:

1. A checking system based on a millimeter wave security inspection device, comprising:
   a background service system comprising at least one server for a checking system based on a millimeter wave security inspection device;
   a switching system, configured to perform a data communication; and
   a security inspection instrument, connected to the server through the switching system, and configured to scan an object to obtain a scanned image, perform an automatic threat recognition (ATR) image interpretation on the scanned image to obtain an ATR image interpretation result, and upload the scanned image and the ATR image interpretation result to the server,
   wherein the server comprises a memory and a processor, the memory storing instructions, and the instructions, when executed by the processor, causing the processor to:
   receive a scanned image of an object and an ATR image interpretation result of the object from the security inspection instrument, wherein the ATR image interpretation result is obtained by the security inspection instrument performing an automatic threat recognition (ATR) image interpretation on the scanned image, and
   cause a manual inspection task to be performed on the object and perform an image interpretation task on the scanned image according to a working mode, wherein the working mode indicates whether the checking system is provided with a manual inspection station and an image interpretation station,
   wherein the processor is further configured to:
   determine whether there are available manual inspection stations in the checking system when the working mode indicates that the checking system is provided with a manual inspection station but is not provided with an image interpretation station, and assign the manual inspection task for the object, the scanned image and the ATR image interpretation result to one manual inspection station selected from the available manual inspection stations, when it is determined that there are available manual inspection stations in the checking system,
   transmit information of the selected manual inspection station to the security inspection instrument, and
   receive a manual inspection result from the manual inspection station, wherein the manual inspection result is generated by the manual inspection station performing the manual inspection task on the object according to the scanned image and the ATR image interpretation result in response to receiving the assigned manual inspection task, wherein the security inspection instrument, the manual inspection station, and the image interpretation station are connected to the background service system, the background service system is configured to store the scanned image, the image interpretation result and the manual inspection result, and distribute and uniformly inquire the scanned image, the image interpretation result and the manual inspection result; the background service system is configured to automatically assign the manual inspection station and the image interpretation station according to a set assignment strategy after a scanning of the object is completed, so that the manual inspection station and the image interpretation station is reused; and the background service system is configured to dynamically adjust numbers of manual inspection stations and image interpretation stations when a traffic of the object changes, and wherein the manual inspection task for the object and the image interpretation task for the scanned image are performed simultaneously.

2. The checking system according to claim 1, further comprising:

at least one manual inspection station, connected to the security inspection instrument and the server through the switching system, wherein the security inspection instrument is configured to:

determine whether the security inspection instrument is currently available in response to receiving a local manual inspection request from the server, transmit a positive confirmation response message to the server, when the security inspection instrument is currently available, and transmit a negative confirmation response message to the server, when the security inspection instrument is currently unavailable, and perform the manual inspection on the object according to the scanned image and the ATR image interpretation result in response to receiving the assigned manual inspection task, and transmit a manual inspection result to the server.

3. The checking system according to claim 1, further comprising:

at least one manual inspection station, connected to the security inspection instrument and the server through the switching system, and at least one image interpretation station, connected to the security inspection instrument and the server through the switch system, and configured to perform an image interpretation on the scanned image, wherein the security inspection instrument is further configured to:

determine whether the security inspection instrument is currently available in response to receiving a local manual inspection request from the server, transmit a positive confirmation response message to the server, when the security inspection instrument is currently available, and transmit a negative confirmation response message to the server, when the security inspection instrument is currently unavailable, and perform the manual inspection on the object according to the scanned image and a second image interpretation result in response to receiving the assigned manual inspection task, and transmit a manual inspection result to the server, wherein the second image interpretation result is generated by the image interpretation station performing an image interpretation on the scanned image according to the ATR image interpretation result in response to receiving the assigned image interpretation task.

4. A checking method using the server for a checking system based on a millimeter wave security inspection device according to claim 1, comprising:

receiving a scanned image of an object and an ATR image interpretation result of the object by the server from the security inspection instrument, wherein the ATR image interpretation result is obtained by the security inspection instrument performing an automatic threat recognition (ATR) image interpretation on the scanned image, and performing a manual inspection task on the object and performing an image interpretation task on the scanned image by the server according to a working mode, wherein the working mode indicates whether the checking system is provided with a manual inspection station and an image interpretation station.

5. The checking method according to claim 4, wherein the performing a manual inspection task on the object and performing an image interpretation task on the scanned image by the server according to a working mode comprises:

determining by the server not to perform the manual inspection task on the object and not to perform the image interpretation task on the scanned image, and storing the scanned image and the ATR image interpretation result, when the working mode indicates that the checking system is not provided with a manual inspection station and an image interpretation station.

6. The checking method according to claim 4, wherein the performing a manual inspection task on the object and performing an image interpretation task on the scanned image by the server according to a working mode comprises:

determining by the server whether there are available manual inspection stations in the checking system, when the working mode indicates that the checking system is provided with a manual inspection station but is not provided with an image interpretation station, and, assigning the manual inspection task for the object, the scanned image and the ATR image interpretation result to one manual inspection station selected from the available manual inspection stations, when it is determined that there are available manual inspection stations in the checking system, transmitting information of the selected manual inspection station to the security inspection instrument, and receiving a manual inspection result from the manual inspection station, wherein the manual inspection result is generated by the manual inspection station performing a manual inspection on the object according to the scanned image and the ATR image interpretation result in response to receiving the assigned manual inspection task wherein the performing a manual inspection task on the object and performing an image interpretation task on the scanned image by the server according to a working mode comprises:

transmitting by the server a local manual inspection request to the security inspection instrument, when it is determined by the server that there is no available manual inspection station in the checking system, assigning by the server a manual inspection task for the object to the security inspection instrument, when a positive confirmation response message is received from the security inspection instrument, wherein the positive confirmation response message is generated by the security inspection instrument when it is determined that the security inspection instrument is currently available in response to receiving the local manual inspection request from the server, and receiving a manual inspection result from the security inspection instrument, wherein the manual inspection result is generated by the security inspection instrument performing a manual inspection on the object according to the scanned image and the ATR image interpretation result in response to receiving the assigned manual inspection task, wherein the manual inspection task for the object and the image interpretation task for the scanned image are performed simultaneously;

wherein the assigning the image interpretation task for the scanned image, the scanned image and the ATR image interpretation result to one image interpretation station of at least one image interpretation station comprises:

selecting an image interpretation station from the at least one image interpretation station according to a predefined strategy, wherein the predefined strategy comprises at least one of: an image interpretation station designated by a user in image interpretation stations associated with the security inspection instrument, whether a gender of the object and a gender of an operator of the image interpretation station being the same, and whether the image interpretation station being idle.

7. The checking method according to claim 4, wherein the performing a manual inspection task on the object and performing an image interpretation task on the scanned image by the server according to a working mode comprises:

assigning the image interpretation task for the scanned image, the scanned image and the ATR image interpretation result to one image interpretation station of at least one image interpretation station, when the working mode indicates that the checking system is not provided with a manual inspection station but is provided with an image interpretation station, and receiving a second image interpretation result from the assigned image interpretation station, wherein the second image interpretation result is generated by the image interpretation station performing an image interpretation on the scanned image according to the ATR image interpretation result in response to receiving the assigned image interpretation task.

8. The checking method according to claim 4, wherein the performing a manual inspection task on the object and performing an image interpretation task on the scanned image by the server according to a working mode comprises:

assigning the image interpretation task for the scanned image, the scanned image and the ATR image interpretation result to one image interpretation station of at least one image interpretation station, when the working mode indicates that the checking system is provided with a manual inspection station and is provided with an image interpretation station, receiving a second image interpretation result from the assigned image interpretation station, determining whether there are available manual inspection stations in the checking system, and assigning the manual inspection task for the object, the scanned image and the second image interpretation result to one manual inspection station selected from the available manual inspection stations, when it is determined that there are available manual inspection stations in the checking system, wherein the second image interpretation result is generated by the image interpretation station performing an image interpretation on the scanned image according to the ATR image interpretation result in response to receiving the assigned image interpretation task, transmitting information of the selected manual inspection station to the security inspection instrument, and receiving a manual inspection result from the manual inspection station, wherein the manual inspection result is generated by the manual inspection station performing a manual inspection on the object according to the scanned image and the second image interpretation result in response to receiving the assigned manual inspection task wherein the performing a manual inspection task on the object and performing an image interpretation task on the scanned image by the server according to a working mode comprises:

transmitting a local manual inspection request to the security inspection instrument, when it is determined that there is no available manual inspection station in the checking system, assigning a manual inspection task for the object and the second image interpretation result to the security inspection instrument, when a positive confirmation response message is received from the security inspection instrument, wherein the positive confirmation response message is generated by the security inspection instrument when it is determined that the security inspection instrument is currently available in response to receiving the local manual inspection request from the server, and receiving a manual inspection result from the security inspection instrument, wherein the manual inspection result is generated by the security inspection instrument performing a manual inspection on the object according to the scanned image and the second image interpretation result in response to receiving the assigned manual inspection task;

wherein an available manual inspection station is determined according to a predefined strategy, wherein the predefined strategy comprises at least one of: a manual inspection station designated by a user in manual inspection stations associated with the security inspection instrument, whether a gender of the object and a gender of an operator of the manual inspection station being the same, whether the manual inspection station being in a predetermined number of passages adjacent to the security inspection instrument, and whether the operator being idle.

9. The checking system according to claim 1, wherein the processor is further configured to: determine not to perform the manual inspection task on the object and not to perform the image interpretation task on the scanned image, and store the scanned image and the ATR image interpretation result, when the working mode indicates that the checking system is not provided with a manual inspection station and an image interpretation station.

10. The checking system according to claim 1, wherein the processor is further configured to:

transmit a local manual inspection request to the security inspection instrument, when it is determined that there is no available manual inspection station in the checking system, assign a manual inspection task for the object to the security inspection instrument, when a positive confirmation response message is received from the security inspection instrument, wherein the positive confirmation response message is generated by the security inspection instrument when it is determined that the security inspection instrument is currently available in response to receiving the local manual inspection request from the server, and receive a manual inspection result from the security inspection instrument, wherein the manual inspection result is generated by the security inspection instrument performing a manual inspection on the object according to the scanned image and the ATR image interpretation result, in response to receiving the assigned manual inspection task.

11. The checking system according to claim 1, wherein the processor is further configured to:

assign the image interpretation task for the scanned image, the scanned image and the ATR image interpretation result to one image interpretation station of at least one image interpretation station, when the working mode indicates that the checking system is not provided with a manual inspection station but is provided with an image interpretation station, and receive a second image interpretation result from the assigned image interpretation station, wherein the second image interpretation result is generated by the image interpretation station performing an image interpretation on the scanned image according to the ATR image interpretation result in response to receiving the assigned image interpretation task.

12. The checking system according to claim 1, wherein the processor is further configured to:

assign the image interpretation task for the scanned image, the scanned image and the ATR image interpretation result to one image interpretation station of at least one image interpretation station, when the working mode indicates that the checking system is provided with a manual inspection station and is provided with an image interpretation station, receive a second image interpretation result from the assigned image interpretation station, wherein the second image interpretation result is generated by the image interpretation station performing an image interpretation on the scanned image according to the ATR image interpretation result in response to receiving the assigned image interpretation task, determine whether there are available manual inspection stations in the checking system, and assign the manual inspection task for the object, the scanned image and the second image interpretation result to one manual inspection station selected from the available manual inspection stations when it is determined that there are available manual inspection stations in the checking system, transmit information of the selected manual inspection station to the security inspection instrument, and receive a manual inspection result from the manual inspection station, wherein the manual inspection result is generated by the manual inspection station performing a manual inspection on the object according to the scanned image and the second image interpretation result in response to receiving the assigned manual inspection task.

13. The checking system according to claim 12, wherein the processor is further configured to:

transmit a local manual inspection request to the security inspection instrument, when it is determined that there is no available manual inspection station in the checking system, assign a manual inspection task for the object and the second image interpretation result to the security inspection instrument when a positive confirmation response message is received from the security inspection instrument, wherein the positive confirmation response message is generated by the security inspection instrument when it is determined that the security inspection instrument is currently available, in response to receiving the local manual inspection request from the server, and receive a manual inspection result from the security inspection instrument, wherein the manual inspection result is generated by the security inspection instrument performing a manual inspection on the object according to the scanned image and the second image interpretation result in response to receiving the assigned manual inspection task.

14. The checking system according to claim 1, wherein the processor is further configured to:

determine an available manual inspection station according to a predefined strategy.

15. The checking system according to claim 14, wherein the predefined strategy comprises at least one of: a manual inspection station designated by a user in manual inspection stations associated with the security inspection instrument, whether a gender of the object and a gender of an operator of the manual inspection station being the same, whether the manual inspection station being in a predetermined number of passages adjacent to the security inspection instrument, and whether the operator being idle.

16. The checking system according to claim 11, wherein the processor is further configured to:

select an image interpretation station from the at least one image interpretation station according to a predefined strategy.

17. The checking system according to claim 16, wherein the predefined strategy comprises at least one of: an image interpretation station designated by a user in image interpretation stations associated with the security inspection instrument, whether a gender of the object and a gender of an operator of the image interpretation station being the same, and whether the image interpretation station being idle.

* * * * *